Aug. 27, 1974  TAKAO MARUI ET AL  3,832,238

GAS RECOVERY DEVICE FOR STORAGE BATTERIES

Original Filed July 9, 1971

INVENTORS
TAKAO MARUI
ATSUSI YOKOGI

BY
Watson, Cole, Grindle & Watson
ATTORNEY

3,832,238
GAS RECOVERY DEVICE FOR STORAGE BATTERIES

Takao Marui, and Atsusi Yokogi, Takatsuki, Japan, assignors to Yuasa Battery Company Limited, Takatsuki, Japan
Continuation of abandoned application Ser. No. 161,243, July 9, 1971. This application Aug. 27, 1973, Ser. No. 392,079
Int. Cl. H01m 1/06
U.S. Cl. 136—179
14 Claims

ABSTRACT OF THE DISCLOSURE

Gas recovering devices for storage batteries comprise a catalyst body disposed in a housing defining a gas recovering chamber which is isolated from the gas space within the storage battery by a sintered, porous, explosion preventing structure disposed between the body of catalyst and an opening from the housing disposed for intercommunicating the latter and the interior of the battery. The sintered, porous, explosion preventing structure includes a water-repellent portion and a water-permeable portion. The water-permeable portion is disposed beneath the catalyst body for returning water produced in the catalyst to the interior of the battery through the opening. The water-repellent portion is disposed to facilitate the passage of gases developed in the battery during the charging of the latter into contact with the catalyst body.

---

This is a continuation of co-pending application Ser. No. 161,243, filed July 9, 1971, now abandoned.

This invention relates to the field of storage batteries and more particularly to devices for recovering gases produced within the storage battery during the charging of the later by catalytically recombining the gases to form water which is then returned to the interior of the battery.

When a conventional storage battery is charged, the electrolyte is decomposed into oxygen and hydrogen gases by electrolysis and will thus be gradually diminished in quantity unless steps are taken to avoid the loss thereof. In order to prevent a decrease in the quantity of the electrolyte, various gas recovering devices have been suggested for catalytically reconverting the gases to form water. For example, in known gas recovering devices, oxygen and hydrogen gases are adsorbed and converted to water vapor by contact with a catalyst body made of a catalytic metal, such as platinum or palladium, supported in a microporous carrier, such as sintered alumina. The water vapor thus produced is condensed, for return to the electrolyte, by a water vapor condensing means disposed around the catalyst body. However, in such previously known gas recovering devices, gas diffusion into the catalyst has been poor and explosion prevention has been insufficient for satisfactory operation. The present invention provides means for improving these conventional defects.

A first object of the present invention is to provide a gas recovering device for a storage battery wherein the device comprises a structure capable of preventing explosions in the explosive mixture of gases produced in the battery during charging.

Another object of the present invention is to provide such a gas recovering device wherein wetting of the catalyst is prevented so that catalysis may proceed without substantial impairment by the water produced thereby.

A further object of the present invention is to provide such a gas recovering device wherein appropriate cooler means are provided so that water vapor may be efficiently recovered after same is produced.

Yet another object of the present invention is to provide such a gas recovering device which safely guards against the development of excessive gas pressures within the device itself.

In summary, the present invention is directed to a gas recovery device for a storage battery which comprises a housing defining a gas recovery chamber and having an opening extending normally downwardly for intercommunicating the chamber and the interior of a battery. A body of catalyst is disposed in the chamber above the opening and a sintered, porous, explosion preventing structure is disposed between the body of catalyst and said opening for the purpose of completely isolating the body of catalyst from the interior of the battery. The explosion preventing structure includes a water-repellent portion and a water-permeable portion, and the latter is disposed beneath the catalyst body for returning water produced in the catalyst to the interior of the battery through the opening.

Figure 1:
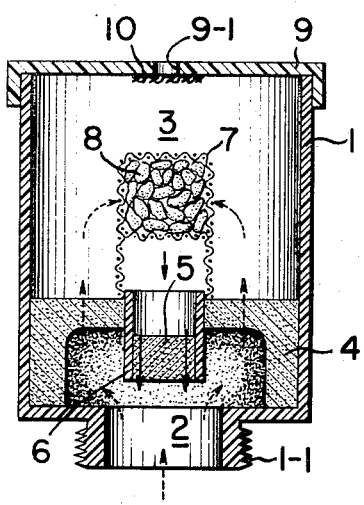
FIG. 1 is an elevational, cross-sectional view of a gas recovering device for a storage battery which has been constructed in accordance with the principles and concepts of the present invention.

FIG. 1 illustrates a gas recovering device which embodies the principles and concepts of the present invention. The device includes a housing 1 constructed of stainless steel, nickel or a heat-resistant synthetic resin such as polycarbonate, polysulfone, ADS, etc. Housing 1 is provided with a screw part 1–1 at its lower end facilitating attachment of the same to the lid of the storage battery and has an opening 2 disposed for normally communicating with interior of a battery. Housing 1 defines a gas recovery chamber 3 containing a catalyst capable of absorbing gases. Opening 2 and chamber 3 are separated from each other by a sintered, porous, explosion preventing structure produced by sintering Alundum or corundum powder or the like. The explosion preventing structure includes a water-repellent portion 4 and a water-permeable portion 5. A water return tube 6 interconnecting opening 2 with chamber 3 is disposed centrally of portion 4 of the explosion preventing structure and portion 5 of the latter is fitted closely within tube 6 at its lower free end. A catalyst container 7, containing a catalyst body 8 of a catalytic metal such as platinum or palladium supported by a microporous carrier such as sintered alumina, is provided above return tube 6 within chamber 3. Container 7 comprises a net or slit plate constructed of an anti-corrosive heat proof material such as stainless steel, nickel, lead, lead alloy or titanium and has apertures which are sufficiently small to prevent the escape of catalyst particles. Housing 1 includes a lid 9 provided with an exhaust port 9–1. A water-repellent microporous film 10, which is shaped by pressing ethylene tetrafluoride fibers, for example, is disposed in port 9–1 for preventing water produced in the catalyst from escaping from the device and for facilitating the suction and exhaustion of gases.

The gas recovering device illustrated in FIG. 1 operates in the following manner. Oxygen and hydrogen gases produced within the storage battery during charging of the latter rise upwardly and are introduced into catalyst-containing chamber 3 through opening 2 and water-repellent porous layer 4. In chamber 3, the oxygen and hydrogen gases contact catalyst body 8 and are catalytically recombined to form water vapor. This water vapor is cooled to form droplets of water which are returned by gravity to the electrolyte within the storage battery through water-permeable porous layer 5. Incidentally, it should be appreciated that in case the pressure within housing 1 rises abnormally, the gases, including any water vapor which has been formed, may be discharged through water-repellent microporous film 10 in port 9–1. Thus, a storage battery provided with a gas recovering device constructed in accordance with the present invention is protected against explosion. Further, since chamber 3 of housing 1 and the interior of the battery will be separated from each other by portions 4 and 5 of the explosion preventing structure, even when catalyst body 8 is heated, it will not be possible for the gases within the storage battery to become ignited.

Figure 2:
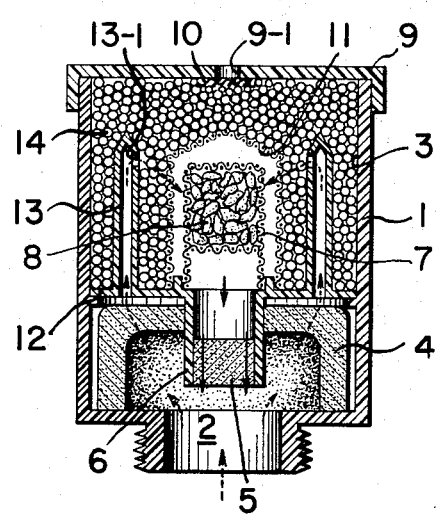
FIG. 2 is an elevational, cross-sectional view of another embodiment of the present invention.

FIG. 2 illustrates an embodiment of the invention which constitutes an improvement of the gas recovering device of FIG. 1. As illustrated in FIG. 2, an anti-corrosive, heat proof, apertured container cover 11 is disposed around container 7, in spaced relationship thereto. Cover 11 is preferably constructed to present a sloped or tapered upper roof and the same may be formed from a wire mesh or slitted plate. Cover 11 may be constructed of a material such as stainless steel, nickel, lead, lead alloy or titanium. A partition wall 12, constructed of an anti-corrosive metal or heat resistant synthetic resin, is disposed atop water-repellent portion 4 and facilitates the mounting of return tube 6. Wall 12 is provided with a number of apertures, and a tube 13 is attached to wall 12 at each aperture for receiving gases therefrom and introducing the same into chamber 3. An opening 13–1 at the free, upper end of each gas introducing tube 13 is directed toward catalyst container cover 11 from a fixed, predetermined distance. Anti-corrosive, heat-proof beads 14, having a diameter of about 0.5 to 3 mm., are contained above partition wall 12 within chamber 3. Beads 14 are made of a glass or ceramic or the like and appropriately, the size of the apertures of container cover 11 should be smaller than the diameter of beads 14.

The gas recovering device illustrated in FIG. 2 operates in the following manner. As illustrated by the dashed line arrows, oxygen and hydrogen gases produced within the storage battery during the charging of the latter, pass upwardly through water-repellent portion 4 of the explosion preventing structure where any acid fog is removed. Upon reaching partition wall 12, the gases pass through tubes 13 and are discharged through openings 13–1 at the free ends of tubes 13. The gases discharged from openings 13–1 are widely diffused through the clearances between adjacent glass beads 14 disposed between gas introducing tubes 13 and container cover 11. When the diffused gases reach the catalyst body 8, the same are catalytically recombined to produce water. When such catalytic reaction commences, the gas density surrounding catalyst body 8 decreases correspondingly so that ambient gas is sucked toward catalyst body 8 and the reaction proceeds successively and automatically. As the catalyst is heated by the heat of reaction, water will be produced in the form of water vapor and the greater part of the water vapor thus produced will be cooled and condensed to form water on the surfaces of the glass beads. A further portion of the water vapor produced will be cooled and condensed to form water by contacting the inside walls of housing 1 and lid 9. The liquid water passes downwardly through the clearances between adjacent beads 14 and collects in tube 6 for return to the electrolyte within the storage battery through water-permeable portion 5 of the explosion preventing structure.

The foregoing construction provides the following advantages. Since the gas recovering chamber 3 within housing 1 and the interior of the storage battery are separated from each other by portions 4 and 5 of the explosion preventing structure, even if gases are ignited by contact with the often red-hot catalyst, the resultant fire will be prevented from igniting and causing the gases in the interior of the storage battery to explode. Further, although return tube 6 is closed at its lower end by portion 5 of the explosion preventing structure, portion 5 is porous whereby recombined water will easily pass therethrough for return to the interior of the battery. Further, in view of the fact that portion 4 of the explosion preventing structure is water repellent, the recombined water can be returned to the interior of the battery only through return tube 6 and portion 5 of the explosion preventing structure.

In order to prevent local overheating due to uneven contact of gases with the catalyst, a fixed distance is maintained and glass beads 14 are contained between catalyst container 7 and openings 13–1 of gas introducing tubes 13. Accordingly, the gases introduced through openings 13–1 will be diffused by glass beads 14 and will reach the catalyst in a highly diffused condition, whereby catalyst body 8 will not be subjected to local overheating. In this connection, it should be noted that if catalyst body 8 becomes locally overheated by uneven contact with gases, the same may become red-hot whereby the likelihood of ignition and explosion of the surrounding explosive gases would be substantially increased.

Since gas recovering chamber 3 is filled with glass beads 14, the water vapor produced by the catalytic reaction is quickly cooled and condensed. As the water gravitates through the clearances between the glass beads and along the surfaces of the beads due to capillarity, the same will accumulate gradually at the lower portions of the device. Moreover, in view of the fact that catalyst 7 is covered with container cover 11 which provides a fixed, open space around container 7, the gravitating water will enter return tube 6 without contacting catalyst 8. Accordingly, the performance of the catalyst will not be impaired by contact with liquid water. Moreover, in the embodiment of the invention illustrated in FIG. 2, the gas space available for containing explosive gases is substantially reduced by virtue of the filling of gas recovering chamber 3 with glass beads 14, whereby the likelihood of explosion within housing 1 is minimized. In this same connection, even if ignition should occur around the catalyst or in the space between container 7 and cover 11, the ignited gases would be quickly cooled by the glass beads whereby to prevent the resultant fire from igniting and exploding the gases in the remainder of the interior of housing 1.

Hole 9–1 in lid 9 of housing 1 is closed with water-repellent microporous film 10, and therefore, when an excessive quantity of gases is produced, the excess may be discharged through the micropores in microporous film 10. Further, when an excessive quantity of hydrogen gas is produced, the partial pressure of oxygen within the system will be decreased correspondingly and additional oxygen gas, in an amount to match the excess of hydrogen gas, may be sucked in from the atmosphere, through water-repellent microporous film 10, whereby the gas recovering efficiency of the device is increased.

Gas recovering devices constructed in accordance with the present invention, were fitted to lead batteries (electrolyte 5.g.1.215, 20° C.) having respective capacities of 130, 500 and 2000 ampere-hours at a rate of 10 hours. Each cell was then tested for practical usage, utilizing a charge system having a constant voltage of 2.15 volts. During this test, a gas recovering performance of more than 95% (based on the theoretical amount of electrolysis) was provided by the recovering device, for more than one year. Additionally, during this same test, a continuous severe current test was conducted on the batteries by elevating the overcharging current value up to 0.05C (C is the rated capacity value of the battery), and maintaining such elevated current for 48 hours. During this severe current test, neither the escape of acid fog nor an explosion induced by the overheating of the catalyst or by an external spark was experienced. After the charging state was returned to a constant voltage of 2.15 volts, no reduction in the functioning of any of the batteries could be recognized.

When the operating life of gas recovering devices constructed according to the present invention was investigated by a procedure wherein a device is fitted to a dummy battery and the latter is continuously charged with an overcharging current of either 0.1 or 0.5 ampere, more than 5 years elapsed without the production of abnormal operations or a reduction of recovering performance or of any other performance.

Figure 3:
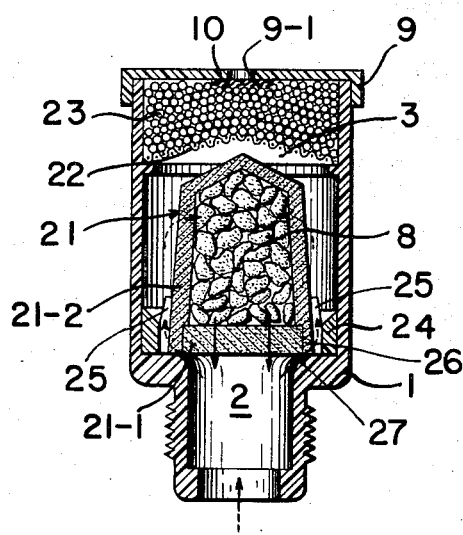
FIG. 3 is an elevational, cross-sectional view of yet another embodiment of the present invention.

FIG. 3 illustrates another embodiment of a gas recovering device constructed in accordance with the present invention. In this instance, catalyst body 8 is contained in a structure comprising an explosion preventing container 21 constructed of sintered Alundum or corundum and the like and container 21 is disposed within chamber 3 as can be seen from FIG. 3. Particularly, it is a feature of this embodiment, that the bottom portion 21–1 of container 21 should be water-permeable while the other portions of container 21 should be water-repellent. In this connection, it should be noted that sintered Alundum or corundum and the like may be made water-permeable by treatment with a permeating agent or surface active agent. Further, such sintered materials may be made water repellent by treatment with silicone, Teflon or paraffin.

A partition wall 22, constructed of stainless steel net, nickel net or a slitted lead alloy plate, is mounted above container 21 in spaced relationship thereto, and glass beads 23 are contained above partitioned wall 22 within vessel 3. As can be seen in FIG. 3, partition wall 22 is formed so as to be higher in elevation at its central portions than at its peripheral portions. The upper portion of container 21 is also tapered and the entirety of container 21 is supported within housing 1 by a number of pins 25 constructed of an anti-corrosive metal or a heat proof synthetic resin such as polycarbonate. The pins 25 are surrounded by a ring 2 for maintaining the container 21 in a fixed position, and as can be seen, a clearance is provided between the ring 24 and the container 21 to permit gas flow.

As shown by the dashed line arrows, the gases produced within the storage battery enter chamber 3 through a passageway 26 between the bottom of container 21 and a shoulder 27 of housing 1. From passageway 26, the gases pass through the clearance between container 21 and ring 24 and through the walls of the upper, water-repellent, porous portion 21–2 of container 21 to contact catalyst body 8 where the same are catalytically reconverted to water vapor. The water vapor rises and is cooled and condensed by contact with beads 23 to form droplets of water which return to the storage battery through the clearance between container 21 and ring 24 and through passageway 26. Further, water droplets produced within catalyst container 21 return to the storage battery through the water-permeable, porous, bottom portion 21–1 of container 21.

A lead battery having a capacity of 50 ampere-hours was fitted with a gas recovering device constructed in accordance with FIG. 3 and another identical lead battery was fitted with a conventional gas recovering device. These systems were comparatively tested with the following results:

| | Gas absorbing capacity, percent | Life |
|---|---|---|
| Recovering device of the present invention. | 95 | More than 5 years (during a trial providing no indication of deterioration up to the present time). |
| Conventional recovering device. | 85 | 3 years. |

In the foregoing tabulation of results, gas absorbing capacity is based on continuously charging the batteries at a constant voltage of 2.4 volts at room temperature.

In devices constructed in accordance with FIG. 3, catalyst body 8 is contained in a sintered, porous, explosion preventing structure in the nature of container 21 and as a result, the space available for gas explosions is so small that even if the catalyst body were to be heated, the risk of explosion is minimal. Further, although not illustrated, a cover provided with a gap could be installed in covering relationship to hole 9–1, for the purpose of preventing the accumulation of external dust or the like in hole 9–1.

Having thus described in detail certain preferred devices which embody the concepts and principles of the instant invention and which accomplish the various objects, purposes and aims thereof, it is to be appreciated and will be apparent to those skilled in the art, that many physical changes could be made in the disclosed gas recovery devices without altering the concepts and principles embodied therein. Hence, it is intended that the scope of the invention be limited only to the extent indicated in the appended claims.

What is claimed is:

1. A gas recovery device for a storage battery comprising:
    a housing defining a gas recovery chamber and having an opening extending normally downwardly for intercommunicating the chamber and the interior of a battery;
    a body of catalyst disposed in said chamber above the opening; and
    a sintered, porous, explosion preventing structure disposed between the body of catalyst and said opening for completely isolating the body of catalyst from the interior of the battery,
        said structure including a water-repellent portion and a water-permeable portion,
        said water-permeable portion being disposed beneath the catalyst body for returning water produced in the catalyst to the interior of the battery through the opening.

2. A device as set forth in claim 1 wherein a downwardly extending water return tube is provided in the housing intercommunicating the chamber and the opening, said tube being disposed beneath the body of catalyst, said water-repellent portion of the structure being disposed in surrounding relationship to the tube and said water-permeable portion of the structure being disposed within the tube at the lower extremity of the latter.

3. A device as set forth in claim 1 wherein is provided an anticorrosive, heatproof, foraminated container in the chamber for containing the catalyst body, the foramina of the container being smaller in size than individual particles of the catalyst body.

4. A device as set forth in claim 2 wherein is included a partition wall above said water-repellent portion of the structure disposed for directing condensed water into the upper extremity of the tube.

5. A device as set forth in claim 3 wherein is provided an anticorrosive, heatproof, apertured container cover disposed around the container in spaced relationship thereto.

6. A device as set forth in claim 4 wherein is provided an anticorrosive, heatproof, foraminated container in the chamber for containing the catalyst body, the foramina of the container being smaller in size than individual particles of the catalyst body, said device further including an anticorrosive, heatproof, apertured container cover disposed around the container in spaced relationship thereto.

7. A device as set forth in claim 6 wherein is provided a hole extending through said partition wall disposed to permit gas flow from the water-repellent portion and into the chamber, said device including a gas inlet tube carried by the partition wall and communicating with said hole, said tube extending upwardly from the partition wall and into the chamber and having an orifice at its upper end disposed for directing gas flow toward said container.

8. A device as set forth in claim 5 wherein said device includes a multitude of anticorrosive, heatproof beads disposed in the chamber above the partition wall and around the container cover.

9. A device as set forth in claim 7 wherein said device includes a multitude of anticorrosive, heatproof beads disposed in the chamber above the partition wall and around the container cover.

10. A device as set forth in claim 8 wherein said container cover includes an upper roof portion which slopes downwardly and outwardly of the cover.

11. A device as set forth in claim 9 wherein said container cover includes an upper roof portion which slopes downwardly and outwardly of the cover.

12. A device as set forth in claim 1 wherein said explosion preventing structure is shaped to present a sintered, porous container which completely surrounds the catalyst body in all directions.

13. A device as set forth in claim 12 wherein is provided an anticorrosive, heatproof, foraminated partition disposed in the chamber above said container and a multitude of anticorrosive, heatproof beads supported by the partition.

14. A device as set forth in claim 1 wherein is provided an outlet disposed in an upper wall of the housing for communicating the interior of the chamber with the surrounding atmosphere, there being also provided a water-repellent, microporous film normally disposed in closing relationship to the outlet.

References Cited
UNITED STATES PATENTS

| | | | |
|---|---|---|---|
| 1,770,974 | 7/1930 | Everett | 136—179.1 |
| 2,615,062 | 10/1952 | Craig | 136—179.1 |
| 2,687,449 | 8/1954 | Gulick et al. | 136—179.1 |
| 3,038,954 | 6/1972 | Paterson et al. | 136—179 |

WINSTON A. DOUGLAS, Primary Examiner

H. A. FEELEY, Assistant Examiner